United States Patent
Hutchinson et al.

(10) Patent No.: US 10,544,915 B2
(45) Date of Patent: Jan. 28, 2020

(54) VEHICLE LAMP ASSEMBLY HAVING AN IMPROVED HEAT SINK WITH LIGHT SHIELD

(71) Applicant: Valeo North America, Inc., Seymour, IN (US)

(72) Inventors: Wilfried Hutchinson, Avrille (FR); Gavin Francis Warner, Columbus, IN (US); Jonathan Blandin, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 45 days.

(21) Appl. No.: 15/498,649

(22) Filed: Apr. 27, 2017

(65) Prior Publication Data

US 2018/0313512 A1    Nov. 1, 2018

(51) Int. Cl.
| | |
|---|---|
| *F21V 21/00* | (2006.01) |
| *F21S 41/43* | (2018.01) |
| *B60Q 1/04* | (2006.01) |
| *F21S 45/47* | (2018.01) |
| *F21S 41/141* | (2018.01) |

(52) U.S. Cl.
CPC .............. *F21S 41/43* (2018.01); *B60Q 1/04* (2013.01); *F21S 41/141* (2018.01); *F21S 45/47* (2018.01)

(58) Field of Classification Search
CPC ....................................... F21S 41/43
USPC ................ 362/509, 538, 539, 547
See application file for complete search history.

(56) References Cited

U.S. PATENT DOCUMENTS

| | | | |
|---|---|---|---|
| 5,993,035 A | 11/1999 | May et al. | |
| 7,311,430 B2 * | 12/2007 | Tsukamoto | F21S 41/147 362/545 |
| 9,028,087 B2 | 5/2015 | Wilcox et al. | |
| 9,322,517 B2 | 4/2016 | Chu et al. | |
| 2008/0239741 A1 * | 10/2008 | Nakada | F21S 41/147 362/507 |
| 2009/0168428 A1 | 7/2009 | Huang | |
| 2010/0085769 A1 * | 4/2010 | Tatsukawa | F21S 41/147 362/539 |
| 2014/0020882 A1 | 1/2014 | Konishi | |
| 2014/0126225 A1 | 5/2014 | Konishi et al. | |
| 2014/0218941 A1 | 8/2014 | Wilcox et al. | |
| 2015/0103545 A1 | 4/2015 | Kato | |
| 2017/0059109 A1 * | 3/2017 | Matsumoto | F21S 48/145 |

(Continued)

FOREIGN PATENT DOCUMENTS

| | | |
|---|---|---|
| EP | 2 846 079 A1 | 3/2015 |
| WO | WO 2015/091462 A1 | 6/2015 |

OTHER PUBLICATIONS

European Search Report and Written Opinion dated Aug. 16, 2018 issued in European Patent Application No. 18 167 330.2.

*Primary Examiner* — Laura K Tso
(74) *Attorney, Agent, or Firm* — Oblon, McClelland, Maier & Neustadt, L.L.P.

(57) ABSTRACT

A heat sink for use in a lamp assembly comprising a body having a first portion that lies in a first imaginary plane and that is adapted to receive at least one light source for emitting light rays and a shield that extends from the first portion. The shield blocks at least a portion of the light rays to facilitate reducing or eliminating glare or back dazzle. The shield is integrally or monolithically formed in the body and lies in a second imaginary plane that is generally orthogonal to the first imaginary plane.

12 Claims, 4 Drawing Sheets

(56) References Cited

U.S. PATENT DOCUMENTS

2017/0088034 A1\* 3/2017 Nakazato ............. B60Q 1/0023
2017/0299137 A1\* 10/2017 Kinoshita ............ B60Q 1/1423

\* cited by examiner

VEHICLE LAMP ASSEMBLY HAVING AN IMPROVED HEAT SINK WITH LIGHT SHIELD

BACKGROUND OF THE INVENTION

1. Field of the Invention

This invention relates to a vehicle lamp assembly and, more particularly, to a vehicle lamp assembly having a heat sink with a light shield.

2. Description of the Related Art

In the field of vehicle lighting systems, government regulations require emitted beams to conform to prescribed patterns. For example, a headlamp is required to produce a low and a high beam. High beams cast most of their light straight ahead in order to maximize the distance that a driver can see. However, high beams generally produce too much glare for safe use when other vehicles are present on the road either in front of the vehicle or oncoming toward the vehicle.

Upward projected light can also "back dazzle" a driver when driving in fog, rain and snow due to retro-reflection of the water droplets. FIG. 1 illustrates a portion of a prior art headlamp assembly showing stray light rays emitted from a light-emitting diode (LED). The rays emitted by the light source are not controlled and consequently leave the headlamp uncontrolled. The stray light rays can cause glare and back dazzle.

Low beams, sometimes called dipped beams, have a more controlled beam pattern of upward light and direct most of their light downward and rightward (in right-traffic countries) or leftward (in left-traffic countries) to provide safe forward visibility without excessive glare to oncoming drivers or back dazzle to the driver of the vehicle.

Further, most international regulations specify a beam with a sharp, asymmetric cut-off that prevents significant amounts of light from being cast into the eyes of the drivers of preceding or oncoming cars.

In some applications, a moveable shield, shade or mask is located between a reflector and a lens in the headlamp assembly. The projection of the top edge of the shield provides a beam cut-off that assists in shaping the beam pattern in order to comply with regulations. The shield, shade or mask is oftentimes a separate part in the headlamp assembly and in some applications, requires a separate driver, such as a solenoid, to actuate the shield, shade or mask between inactive and active positions.

What is needed, therefore, is an improved system and method for shielding a beam pattern in order to shield direct light from a light source, such as a light-emitting diode (LED), in order to reduce or eliminate glare and back dazzle.

SUMMARY OF THE INVENTION

It is, therefore, a primary object of the invention to provide a lamp assembly that reduces or eliminates glare and/or back dazzle.

Another object of the invention is to provide a lamp assembly having a heat sink that is adapted to shield at least a portion of the light beam to reduce glare and back dazzle.

Still another object of the invention is to provide a heat sink onto which at least one light source is mounted and having a shield for shielding at least a portion of a beam from the at least one light source in order to reduce glare and back dazzle.

Another object of the invention is to provide a heat sink having a shield that is integrally or monolithically formed in the heat sink.

Yet another object of the invention is to provide a heat sink for use in a lamp assembly that registers or orients a light source, such as a light-emitting diode (LED), relative to a shield of the heat sink.

Still another object of the invention is to provide a shield that is directly added to, integrally formed or monolithically formed as part of the heat sink which simultaneously supports a light source.

Another object of the invention is to provide a heat sink having a shield that is directly associated and in operative relationship with the light source and which allows control of the positioning, registration and tolerance for the shield relative to the light source that is mounted on a heat sink.

Another object of the invention is to provide a system and method for accurately positioning and registering a shield relative to the light source.

Another object of the invention is to provide a system and method for positioning a shield relative to a light source and reducing a number of existing parts by integrating the shield into the heat sink.

Another object of the invention is to provide a shield that not only shields light from the light source to reduce glare and back dazzle, but also protects the light source during transportation or assembly steps, Another object of the invention is to provide a shield that is integrally or monolithically formed in the heat sink.

Another object of the invention is to provide a heat sink having a shield that can be customized to a particular application in order to reduce the risk of direct exposition of the LED heat/power which creates a heat constraint to the surrounding parts or where the sun rays reverse focusing into the optical surfaces which creates a hot spot.

In one aspect, one embodiment of the invention comprises a heat sink for use in a lamp assembly, the heat sink comprising a body having a first portion that lies in a first plane and that is adapted to receive and support at least one light source for emitting light rays, and a shield extending from the first portion, the shield blocking at least a portion of the light rays.

In another aspect, another embodiment of the invention comprises a headlamp assembly comprising a support, a reflector mounted on the support, a heat sink comprising a body having a first portion that lies in a first plane and that is adapted to receive at least one light source for emitting light rays, and a shield extending from the first portion, the shield blocking at least a portion of the light rays.

In yet another aspect another embodiment of the invention comprises a method for making a heat sink with an integrated shield, the method comprising the steps of bending or forming a heat sink form into a predetermined configuration such that the shield is defined by at least a portion of the heat sink form that was bent or formed, wherein the heat sink is formed in a one-piece construction.

This invention, including all embodiments shown and described herein, could be used alone or together and/or in combination with one or more of the features covered by one or more of the following list of features:

- The heat sink wherein the shield is integrally or monolithically formed in the body.
- The heat sink wherein the shield lies in a second plane that is generally orthogonal to the first plane.
- The heat sink wherein the shield is integrally or monolithically formed with the first portion to form a generally L-shape in cross section.
- The heat sink wherein the shield comprises an edge that provides or defines a cutoff of at least a portion of the light rays.

The heat sink wherein the edge is not straight.

The heat sink wherein at least a portion of the light rays from the at least one light source are directed to non-optical surfaces and the shield blocks them.

The heat sink wherein the heat sink comprises a landing area for mounting the at least one light source, the landing area being oriented in operative relationship with the shield so that when the light source is mounted on the landing area, it becomes registered within a predetermined tolerance with respect to the shield.

The headlamp assembly wherein the shield is integrally or monolithically formed in the body of the heat sink.

The headlamp assembly wherein the shield lies in a second plane that is generally orthogonal to the first plane.

The headlamp assembly wherein the shield is integrally or monolithically formed with the first portion to form a generally L-shape in cross section.

The headlamp assembly wherein the shield comprises an edge that provides or defines a cutoff of at least a portion of the light rays.

The headlamp assembly wherein the first portion comprises a landing area for mounting the at least one light source, the landing area being oriented in operative relationship with the shield so that when the light source is mounted on the landing area, it becomes registered within a predetermined tolerance with respect to the shield.

The headlamp assembly wherein the support is at least one of a headlamp housing or headlamp bezel.

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

Figure 2A:
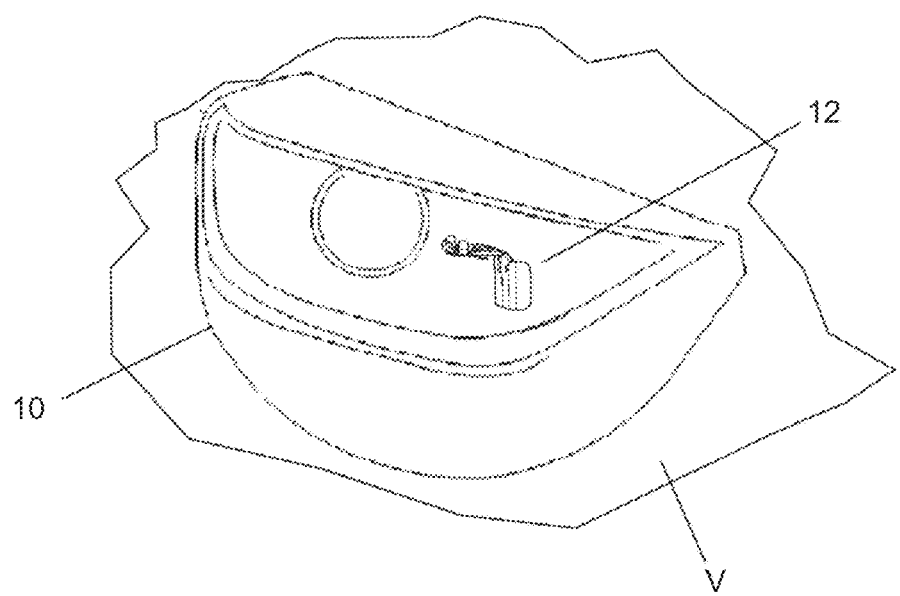
FIG. 2A is a fragmentary view of a vehicle comprising a headlamp assembly having a light module and heat sink in accordance with one embodiment of the invention.
Figure 2B:
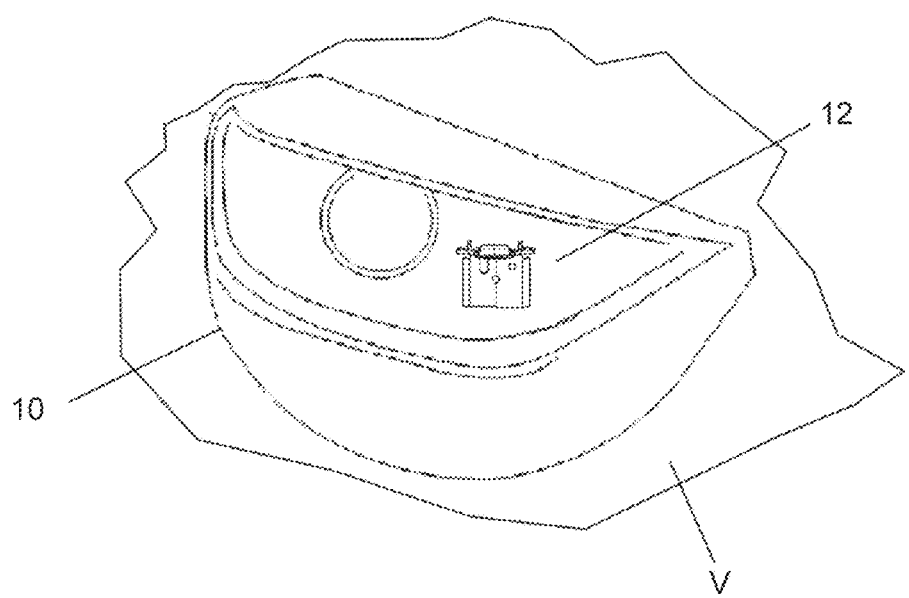
FIG. 2B is another fragmentary view of a vehicle comprising a headlamp assembly having a light module and heat sink in accordance with one embodiment of the invention.

FIG. 2A illustrates a lamp assembly 10 in accordance with one embodiment of the invention. In this embodiment, the lamp assembly 10 is a headlamp assembly for projecting a high beam and a low beam. In the illustration, the lamp assembly 10 is mounted on a vehicle V shown in fragmentary view in FIG. 2A. FIG. 2B illustrates another embodiment of the invention where the lamp assembly 10 is mounted on the vehicle V.

Figure 3:
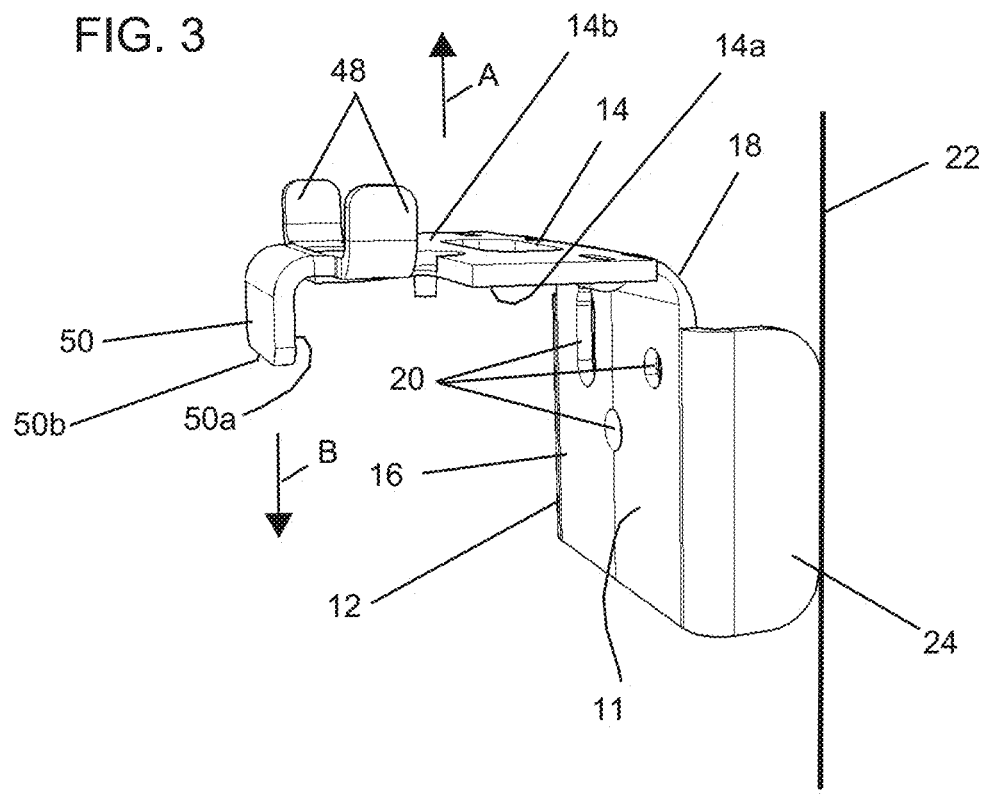
FIG. 3 is a perspective view of a heat sink in accordance with one embodiment of the invention.
Figure 4:
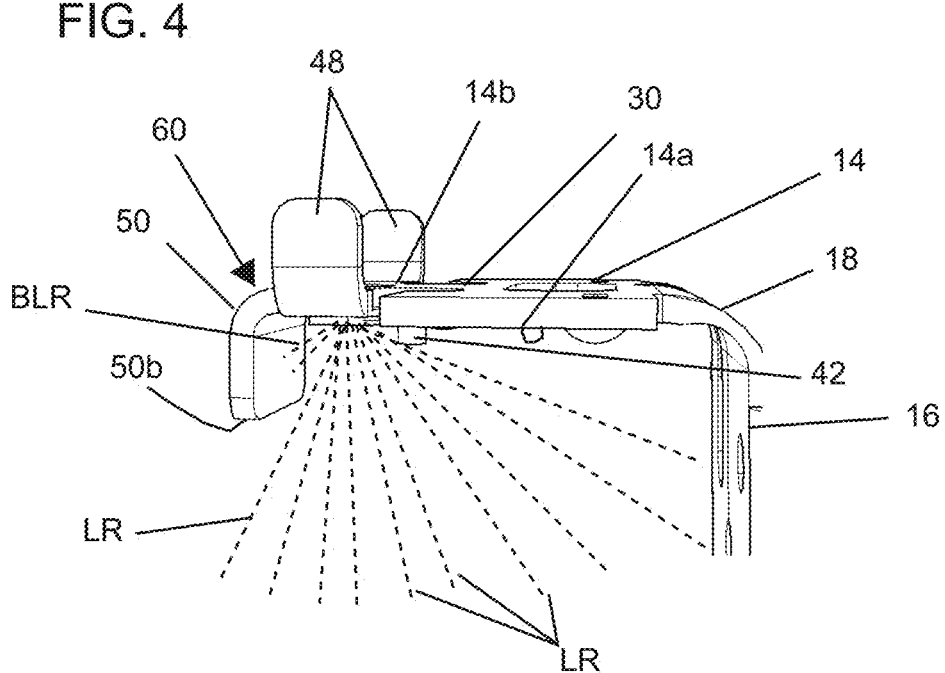
FIG. 4 is another view of the heat sink shown in FIG. 3 illustrating various features of the embodiment, including relationship between the shield and the light source or LED.
Figure 5:
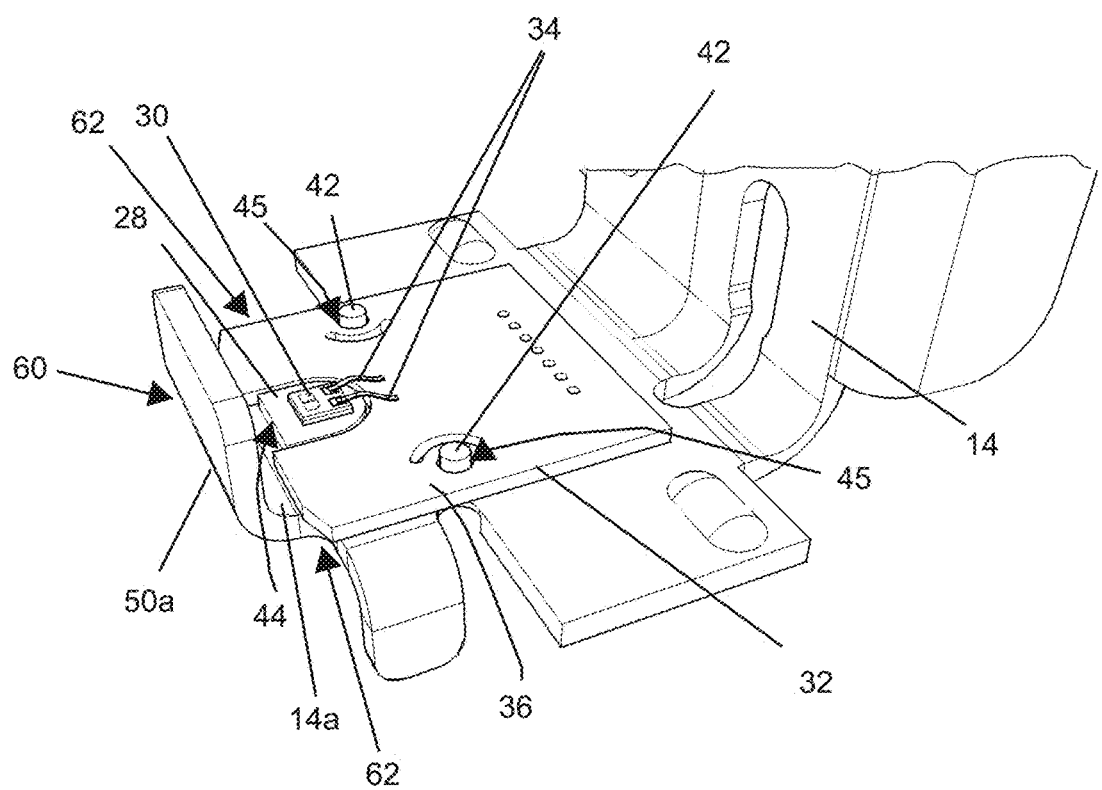
FIG. 5 is a perspective view of a heat shield in accordance with one embodiment of the invention illustrating the shield directly associated and registered relative to an LED that is also mounted on the heat shield allowing the best possible top placement within tolerance for a shield relative to a light source.

Referring now to FIGS. 3-5, the lamp assembly 10 comprises a heat sink 12 comprising a body 11 having a first portion 14, a second portion 16 and a joining portion 18 which joins the first portion 14 with the second portion 16. As illustrated in FIG. 3, the body 11 is an integral or monolithic construction that is generally L-shaped as shown.

The second portion 16 of the heat sink 12 comprises a plurality of holes or apertures 20 that are adapted to receive hardware, such as at least one fastener, a locating or registering post (not shown), a cable harness or clip, or other hardware (not shown) for mounting the heat sink 12 on a reflector (not shown) or a housing (not shown). Note that the heat sink 12 may comprise one or a plurality of wings 24 and 26 which may further facilitate locating the heat sink 12 on the headlamp housing 22 in a manner conventionally known.

The first portion 14 of the heat sink 12 comprises a generally planar surface 14a and a light source mounting or landing area 28 (FIG. 5) for mounting at least one light source 30, such as a light-emitting diode (LED), an organic LED, a highly pixellized LED, or a laser diode. The generally planar surface 14a also supports a printed circuit board or PCB 32 which is coupled to the at least one light source 30 with a plurality of conductors 34, electrical connections, wire or cable ribbon (not shown). It should also be understood that the at least one light source 30 can be mounted transversely versus the road (see FIG. 5) or longitudinally or in any angle desired. The printed circuit board or PCB 32 powers and controls the operation of the at least one light source 30. Note that the light source mounting or landing area 28 comprises a generally U-shape that defines a raised landing surface 36 that registers the at least one light source 30 in generally the same plane as the printed circuit board or PCB 32. The raised landing surface 36 is received in a generally U-shaped aperture 44 of the printed circuit board or PCB 32.

Note that the heat sink 12 comprises a pair of guide or registration posts 42 which cooperate with and are received in mating apertures 45 in the printed circuit board or PCB 32 to register and locate the printed circuit board or PCB 32 relative to the at least one light source 30 as illustrated in FIG. 5.

As illustrated in FIG. 4, the heat sink 12 further comprises a second pair of wings or tab portions 48 which extend away from a surface 14b in a first direction, indicated by arrow A in FIG. 3. The plurality of wings or tab portions 48 are generally parallel to each other and generally orthogonal to an imaginary plane in which the generally planar surface 14a lies.

The heat sink 12 further comprises a light shield 50 that extends away from surface 14a and in a direction of arrow B in FIG. 3 as shown. In the illustration being described, the shield 50 is integrally or monolithically formed in the first portion 14 of the heat sink 12. The shield 50 and the at least one light source 30 become automatically registered and aligned with respect to each other after the at least one light source 30 is mounted to the light source mounting or landing area 28. The shield 50 is adapted, sized and shaped so that a surface 50a blocks at least a portion of the light rays LR (FIG. 4) and prevent them from being projected in an undesirable direction, such as toward non-optical surfaces. FIG. 4 illustrates the blocked light rays BLR. It is important to note that the shield 50 is directly linked, and in the illustration being described, integrally or monolithically formed as part of the heat sink 12. This design is advantageous because it allows for automatic and accurate registration within predetermined desired tolerances, which are typically +/−0.2 mm of the at least one light source 30 relative to the shield 50. The light source mounting or landing area 28 on the heat sink 12 assures registration of the at least one light source 30 relative to the shield 50 and facilitates accurate positioning of the shield 50 relative to the at least one light source 30.

The shield 50 extends in the direction of arrow B as illustrated in FIG. 3. It should be understood that the shield 50 lies in a plane that is generally orthogonal to the generally planar surface 14*a* and generally parallel to the second portion 16.

As illustrated in FIG. 5, the at least one light source 30 is mounted onto the light source mounting or landing area 28 using conventional means, such as by an adhesive or glue. The printed circuit board or PCB 32 is positioned on the generally planar surface 16*a* using the plurality of registration posts 42 which are received in the generally U-shaped apertures 45 of the printed circuit board or PCB 32. After the printed circuit board or PCB 32 and at least one light source 30 are mounted on the heat sink 12, electrical connectors 34 are used to connect the at least one light source 30 to the printed circuit board or PCB 32 in a manner conventionally known so that the printed circuit board or PCB 32 can supply power to the at least one light source 30.

Figure 1A:
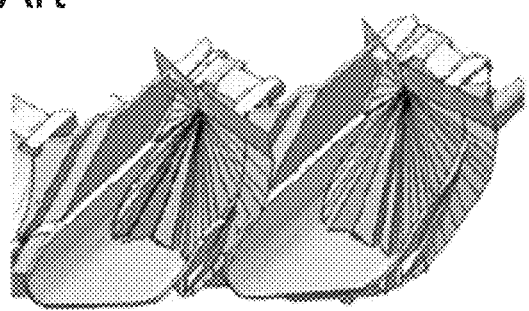
FIGS. 1A and 1B are perspective views of a portion of a prior art headlamp assemblies and reflector R illustrating direct LED rays that are not controlled or shielded and that can potentially cause glare and back dazzle.
Figure 1B:
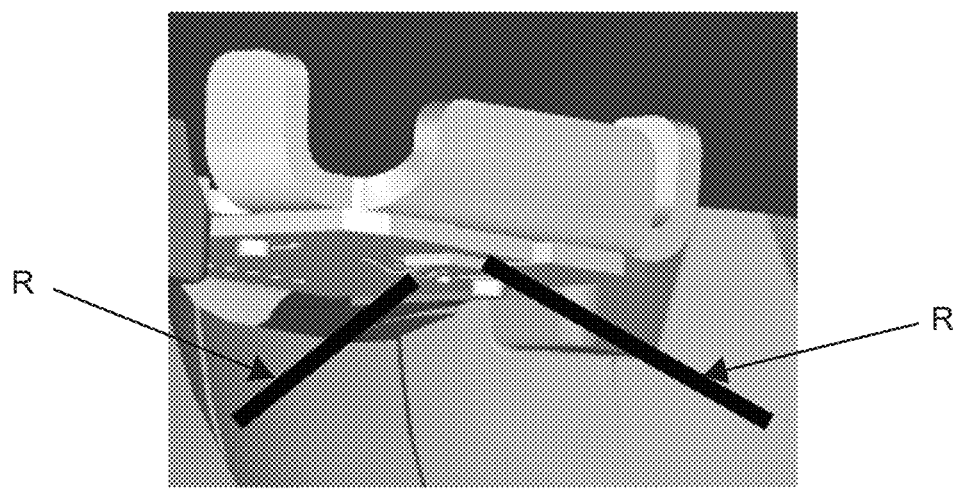

Advantageously, when these components are mounted to the heat sink 12, note that the at least one light source 30 becomes registered relative to the shield to provide effective and desired shielding, blocking or masking of at least one of the light rays LR, The shield 50 has a surface 50*a* that provides a shield or blocking surface that blocks unwanted stray light rays LR as illustrated in FIG. 4. Without the shield 50, the stray light rays LR would be projected in undesired directions, such as away from pre-designed reflecting surfaces of a reflector (FIG. 1) and out of the lamp assembly 10. The light rays LR that project in an undesired direction have been found to produce glare or back dazzle.

The embodiment described herein advantageously provides a low cost and effective means for reducing or eliminating altogether glare and back dazzle. To facilitate reducing glare or back dazzle, the surface 50*a* may be opaque, reflective or with texture so that the stray light rays are directed as desired, such as toward a reflector.

In the illustration being described, the shield 50 is integrally or monolithically formed as part of the heat sink 12, but it should be understood that a shield that is not integrally formed could also be used. For example, a shield (not shown) could be secured to the second portion 16 using a weld, adhesive or other type of fastener or fastening means.

Another advantageous feature of the illustration being described is that the shield 50 provides a cost effective and integral solution because it eliminates the need for additional parts and adds for thermal dissipation. The heat sink 12 may be provided in a stamped sheet (not shown) that is then processed and bent in areas 60 and 62 (FIG. 5) to provide or define the shield 50 and wings 48 (FIG. 4), for example. This one-piece construction has been found to be advantageous because it eliminates parts and assembly.

In this example, the shield 50 is generally rectangular. However, it should be understood that the shield 50 could be customized to have any desired shape. Note that an edge 50*b* of the shield 50 is generally straight in the example, but it could be not straight or provided in another configuration, such as a curved, stepped or asymmetrical line or edge as illustrated in the alternate embodiments of FIG. 6. Shield 50' includes curved edge 50*a*' and shield 50" includes stepped edge 50*a*".

Figure 6:
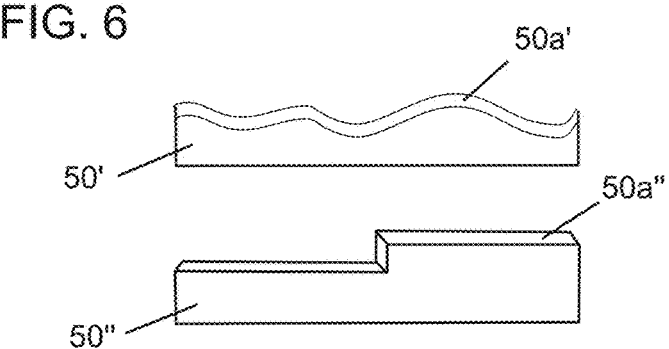
FIG. 6 is a fragmentary view of different embodiments of a shielded edge.

Note also that the shield 50 provides a protector for protecting the at least one light source 30, printed circuit board or PCB 32 and the electrical connectors 34 during transport and assembly. Again, the shield 50 has an edge 50*b* (FIG. 3) that is generally straight, but it could have a stepped, curved portion, arcuate portion or asymmetrical shaped area, as illustrated in FIG. 6.

In the illustration being described, the heat sink 12 is stamped or processed into a one-piece integral and monolithic construction from a conventional material, such as a metal material like aluminum or other desired material. It should also be understood, however, that the heat sink 12 could be produced in other conventional manners, such as using a die cast process or the like.

Advantageously, the system and method described herein provide one or more of the following features that may be used alone or in combination:

- a lamp assembly that reduces or eliminates glare.
- a lamp assembly having a heat sink that is adapted to shield at least a portion of the light beam to reduce glare and back dazzle.
- a heat sink having a shield for shielding at least a portion of a beam from a light source in order to reduce glare and back dazzle.
- a heat sink having a shield that is integrally formed in the heat sink.
- a heat sink used in a lamp assembly that registers or orients a light source, such as a light-emitting diode (LED), relative to a shield of the heat sink.
- a shield that is directly added to or integrally formed as part of the heat sink which supports a light source.
- a heat sink having a shield that is directly associated with the light source and which allows the best possible control of the positioning, registration and tolerance for the shield relative to the light source.
- a system and method for accurately positioning and registering a shield relative to the light source.
- a system and method for positioning a shield relative to a light source and reducing the number of existing parts by integrating the shield into the heat sink.
- a shield that not only shields light from the light source to reduce glare and back dazzle but also protects the light source during transportation or assembly steps,
- a shield that is integrally formed in the heat sink.
- a heat sink having a shield that can be customized to a particular application in order to reduce the risk of LED burn or sun burn.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A heat sink for use in a lamp assembly, said heat sink comprising a unified body having:

a first portion that lies in a first plane and that is adapted to receive and support at least one light source for emitting light rays;

a second portion that lies in a second plane generally orthogonal to said first plane extends in a first direction from said first portion, and is configured to be attached to a housing of the lamp assembly, and a third portion that lies in a third plane generally orthogonal to said first plane and generally parallel to said second plane and extends in said first direction from said first portion, said third portion configured as a shield to block at least a first portion of said light rays directed out of the lamp assembly and configured to not block a second portion of said light rays directed towards reflective surfaces of the lamp assembly.

2. The heat sink as according to claim 1, wherein said third portion is configured to block light rays projected towards non-optical surfaces of said lamp assembly.

3. A heat sink for use in a lamp assembly, said heat sink compromising a unified body having:

a first portion that lies in a first plane and that is adapted to receive and support at least one light source emitting light rays;

a second portion that lies in a second plane generally orthogonal to said first plane, extends in a first direction from said first portion, and is configured to be attached to a housing of the lamp assembly, and a third portion that lies in a third plane generally orthogonal to said first plane and generally parallel to a said second plane and extends in said first direction from said first portion, said third portion configured as a shield to block at least a portion of said light rays, wherein said lamp assembly has reflective surfaces; and said third portion is configured to block light rays projected away from said reflective surfaces.

4. The heat sink according to claim 3, wherein said third portion is configured to block lights rays projected away from said reflective surfaces and out of the lamp assembly.

5. The heat sink according to claim 1, wherein said second portion extends in said first direction a first distance, said third portion extends in said first direction a second distance, and said first distance is greater than said second distance.

6. The heat sink according to claim 1, compromising a heat sink form, wherein said third portion comprises a section of said heat sink form bent to extend in said first direction.

7. The heat sink according to claim 6 wherein said first portion comprises tab portions each extending in a plane generally orthogonal to said first plane and extending in a second direction generally opposite to said first direction.

8. The heat sink according to claim 7, wherein each of said tab portions comprises a section of said heat sink form bent to extend in said second direction.

9. A heat sink for use in a lamp assembly, said heat sink comprising a unified body having:

a first portion that lies in a first plane and that is adapted to receive and support at least one light source for emitting light rays;

a second portion that lies in a second plane generally orthogonal to said first plane, extends in a first direction from said first portion, and is configured to be attached to a housing of the lamp assembly, and a third portion that lies in a third plane generally orthogonal to said first plane and generally parallel to a said second plane and extends in said first direction from said first portion, wherein said lamp assembly has reflective surfaces, said third portion is configured tp receive at least a portion of said light rays being projected away from the reflective surfaces, and said third portion has a surface receiving the portion of light rays configured to direct received light rays towards the reflective surfaces.

10. The heat sink according to claim 9, wherein the third portion has an edge having one of a curved, stepped and asymmetrical shape.

11. The new heat sink according to claim 1, wherein the third portion has an edge having one of a curved, stepped and asymmetrical shape.

12. The heat sink according the claim 3, wherein the third portion has an edge having one of a curved, stepped an asymmetrical shape.

* * * * *